(12) United States Patent
Jeninga et al.

(10) Patent No.: US 9,348,996 B2
(45) Date of Patent: May 24, 2016

(54) METHOD AND DEVICE FOR THE AUTHENTICATION OF AT LEAST TWO AGRICULTURAL DEVICES COUPLED VIA A DATA BUS

(71) Applicant: CLAAS SAULGAU GMBH, Bad Saulgau (DE)

(72) Inventors: Jasper Jeninga, Ravensburg (DE); Florian Dirlewanger, Bad Saulgau (DE); Andreas Mock, Wolpertswende (DE)

(73) Assignee: CLAAS E-SYSTEMS KGAA MBH & CO KG, Guetersloh (DE)

( * ) Notice: Subject to any disclaimer, the term of this patent is extended or adjusted under 35 U.S.C. 154(b) by 61 days.

(21) Appl. No.: 14/147,970

(22) Filed: Jan. 6, 2014

(65) Prior Publication Data
US 2014/0196109 A1    Jul. 10, 2014

(30) Foreign Application Priority Data
Jan. 8, 2013    (DE) .......................... 10 2013 000 088

(51) Int. Cl.
| | |
|---|---|
| G06F 21/44 | (2013.01) |
| H04L 29/06 | (2006.01) |
| H04L 9/08 | (2006.01) |
| H04L 9/32 | (2006.01) |
| H04L 29/08 | (2006.01) |

(52) U.S. Cl.
CPC .............. *G06F 21/445* (2013.01); *H04L 9/083* (2013.01); *H04L 9/3273* (2013.01); *H04L 63/08* (2013.01); *H04L 67/12* (2013.01)

(58) Field of Classification Search
CPC combination set(s) only.
See application file for complete search history.

(56) References Cited

U.S. PATENT DOCUMENTS

| | | | |
|---|---|---|---|
| 8,035,494 B2* | 10/2011 | Waldmann et al. ...... | 340/426.11 |
| 8,280,595 B2 | 10/2012 | Foster et al. | |
| 2008/0303648 A1 | 12/2008 | Day | |

FOREIGN PATENT DOCUMENTS

| | | |
|---|---|---|
| DE | 10 2007 022 100 | 11/2008 |
| EP | 1 312 492 | 5/2003 |
| EP | 1 990 753 | 11/2008 |
| EP | 2 154 864 | 3/2010 |

OTHER PUBLICATIONS

ISO 11783-1 Jun. 15, 2007: Tractors and Machinery for Agriculture and Forestry—Serial Control and Communications Data Network; Part 1: General Stnadard for Mobile Data Communication.

* cited by examiner

*Primary Examiner* — Beemnet Dada
(74) *Attorney, Agent, or Firm* — Michael J. Striker

(57) ABSTRACT

A method for the authentication of at least two agricultural devices coupled via a data bus includes subjecting the each of the agricultural devices to authentication, automatically and independently of every of the agricultural device by use of an authentication device, which is also coupled to the data bus. The method also includes allowing a direct data exchange or indirect data exchange between the successfully authenticated agricultural devices, automatically. If authentication of the at least two data devices is unsuccessful, data exchange between the unsuccessfully authenticated agricultural devices is disallowed.

16 Claims, 3 Drawing Sheets

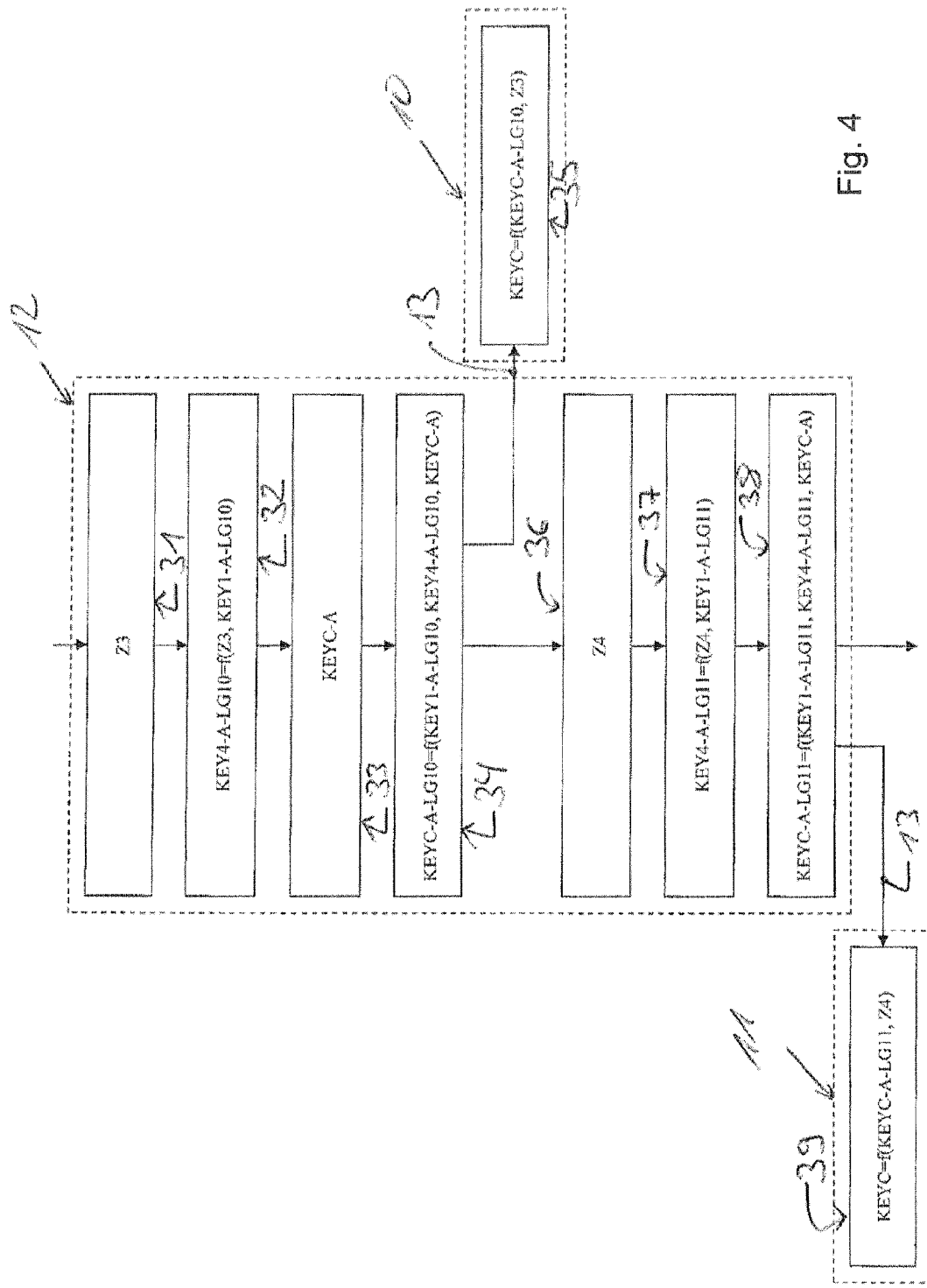

METHOD AND DEVICE FOR THE AUTHENTICATION OF AT LEAST TWO AGRICULTURAL DEVICES COUPLED VIA A DATA BUS

CROSS-REFERENCE TO A RELATED APPLICATION

The invention described and claimed hereinbelow is also described in German Priority Document DE 10 2013 000088.2, filed on Jan. 8, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a method for the authentication of at least two agricultural devices coupled via a data bus and an authentication device for carrying out the method.

In order to carry out certain types of agricultural work, it is necessary to couple at least two agricultural devices in a manner that is mechanical and/or hydraulic and/or pneumatic and/or electrical. In order to perform harvesting work, for example, it may be necessary to couple a first agricultural device embodied as a tractor to a second agricultural device embodied as a harvesting machine. In that case, the harvesting machine is moved forward by means of the tractor, wherein the tractor provides mechanical power and/or hydraulic power and/or pneumatic power and/or electric power in order to operate the harvesting machine.

Furthermore, modern agricultural devices can be coupled on the control side in order to exchange control-side data, specifically via a data bus. One option, for example, is for a harvesting machine to influence the operation of the tractor, for example, in that the harvesting machine requests more power from the tractor and/or influences the direction of motion of the tractor. It must be ensured that an influencing of the operation of the tractor by the harvesting machine does not result in unsafe operating states on the tractor, in addition, the tractor must not induce unsafe operating states on the harvesting machine. It should therefore be ensured that only properly allowed and certified agricultural devices are coupled to one another on the control side. This can take place by authenticating the agricultural devices that are coupled via the data bus.

Based on practical experience, it is known to perform authentication of agricultural devices coupled via a data bus whereby an operator of the agricultural devices calls up authentication codes via the Internet or via wireless communication n and/or enters these authentication codes by him or herself. According to these known methods, input from the operator is required and, therefore, the authentication is susceptible to error. In addition, access to the Internet or wireless communication is unavailable on the field at times and, therefore, authentication cannot be performed.

SUMMARY OF THE INVENTION

The present invention overcomes the shortcomings of known arts, such as those mentioned above.

To that end, the present invention provides a novel method for the authentication of at least two agricultural devices coupled via a data base and, an authentication device for carrying out the method.

In one embodiment, the invention provides a method for authenticating at least two agricultural devices coupled via a data bus. The method includes that each of the agricultural devices coupled to the data bus is subjected to authentication, automatically and independently of the other (or every other) agricultural device via an authentication device that also is coupled to the data bus. Direct data exchange or indirect data exchange between the successfully authenticated agricultural devices is then automatically allowed, while data exchange with an agricultural device that was not successfully authenticated is automatically disallowed. The authentication method according to the invention takes place fully automatically and requires no input by the operator. Access to the Internet or wireless communication is not required.

In an embodiment, in order to authenticate every agricultural device that is coupled to the data bus, the authentication device is verified via the particular agricultural device, and the particular agricultural device is verified via the authentication device. Such an authentication takes place fully automatically and is interception-proof.

The verification of the authentication device preferably takes place via the particular agricultural device with the following steps. The particular agricultural device transmits an identification number that is stored in the control device thereof and a random number determined by the control device thereof to the authentication device. The authentication device determines a first device key on the basis of the identification number transmitted by the particular agricultural device. The authentication device determines a second device key on the basis of the first device key and, on the basis of the random number transmitted by the particular agricultural device. The authentication device transmits the second device key and a random number determined by the authentication device to the control device of the particular agricultural device. The particular agricultural device also determines a second device key, on the basis of a first device key stored in the control device thereof and, on the basis of the random number determined thereby. The agricultural device then compares this second device key determined thereby with the second device key that was determined and transmitted by the authentication device. If these two second device keys match, the authentication device has been successfully verified via the particular agricultural device.

The verification of the particular agricultural device preferably takes place via the authentication device with the following steps. The particular agricultural device determines a third device key, on the basis of the first device key stored in the control device thereof and on the basis of the random number transmitted by the authentication device and, transmits this third device key to the authentication device. The authentication device also determines a third device key, on the basis of the first device key determined thereby and, on the basis of the random number determined thereby. The authentication device then compares the third device key so determined with the third device key that was determined and transmitted by the particular agricultural device. If the two third device keys match, the particular agricultural device has been successfully verified via the authentication device.

Secret device codes of the particular agricultural device are not transmitted in the aforementioned verification of the authentication device or in the aforementioned verification of the particular agricultural device, but rather only random numbers and device keys that have been non-reversibly determined depending on the random numbers. The authentication method according to the invention is therefore interception-proof.

After successful verification of the authentication device and the particular agricultural device, the particular agricultural device is successfully authenticated. Direct data exchange or indirect exchange is then automatically allowed between successfully authenticated agricultural devices. Indirect data exchange is carried out between successfully authenticated agricultural devices via the authentication device. Direct data exchange is carried out between successfully authenticated agricultural devices while bypassing the authentication device, namely via a combination key determined for this purpose.

BRIEF DESCRIPTION OF THE DRAWINGS

Further features and advantages of the invention will become apparent from the description of embodiments that follows, with reference to the attached figures, wherein:

FIG. 4 presents a signal-flow diagram illustrating a determination of combination keys for use in a direct data exchange between successfully authenticated agricultural devices, according to the invention.

DETAILED DESCRIPTION OF THE INVENTION

Figure 1:
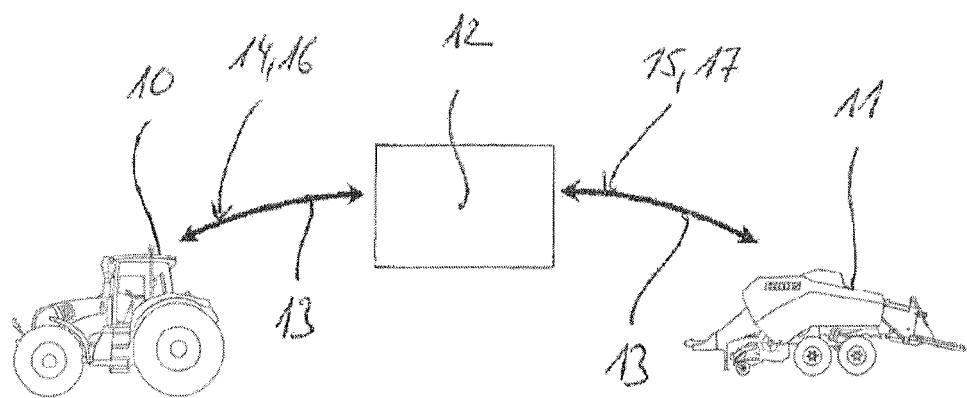
FIG. 1 depicts a first schematic representation of two agricultural devices coupled via a data bus, to illustrate a first embodiment of the invention.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The invention relates to a method for the authentication of at least two agricultural devices coupled via a data bus and, an authentication device for carrying out the method.

The invention is described in the following for an application in which a first agricultural device 10 from a first manufacturer, i.e., a tractor, is coupled to a second agricultural device 11 from another, second manufacturer, i.e., a harvesting machine, by use of a data bus 13 on the control side. It should be recognized, however, that the invention is not limited to this application but can be used whenever a need arises to couple two agricultural devices typically deriving from different manufacturers.

The authentication of the first and second agricultural devices 10 and 11, i.e., the tractor 10 and the harvesting machine 11, respectively, takes place with the following steps. First, each of the first and second agricultural devices 10, 11 coupled to the data bus 13 is subjected to an authentication 14, 15, automatically and independently of the other or every other agricultural device 10, 11, via an authentication device 12. The authentication device 12 also is coupled to the data bus 13. Indirect data exchange 16, 17 (see FIG. 1) or direct data exchange 18 (see FIG. 2) between the successfully authenticated agricultural devices 10, 11 is then automatically allowed, while data exchange with an agricultural device 10, 11 that was not successfully authenticated is automatically disallowed.

With the aid of the invention, it is ensured, fully automatically and without the need for input by the operator and without the need for access to the Internet or wireless communication, which only allowed and certified agricultural devices, can be coupled to one another on the control side. it can thereby be ensured in a fully automatic manner that only allowed or certified agricultural devices can be operated in combination with one another and influence one another during operation.

Figure 3:
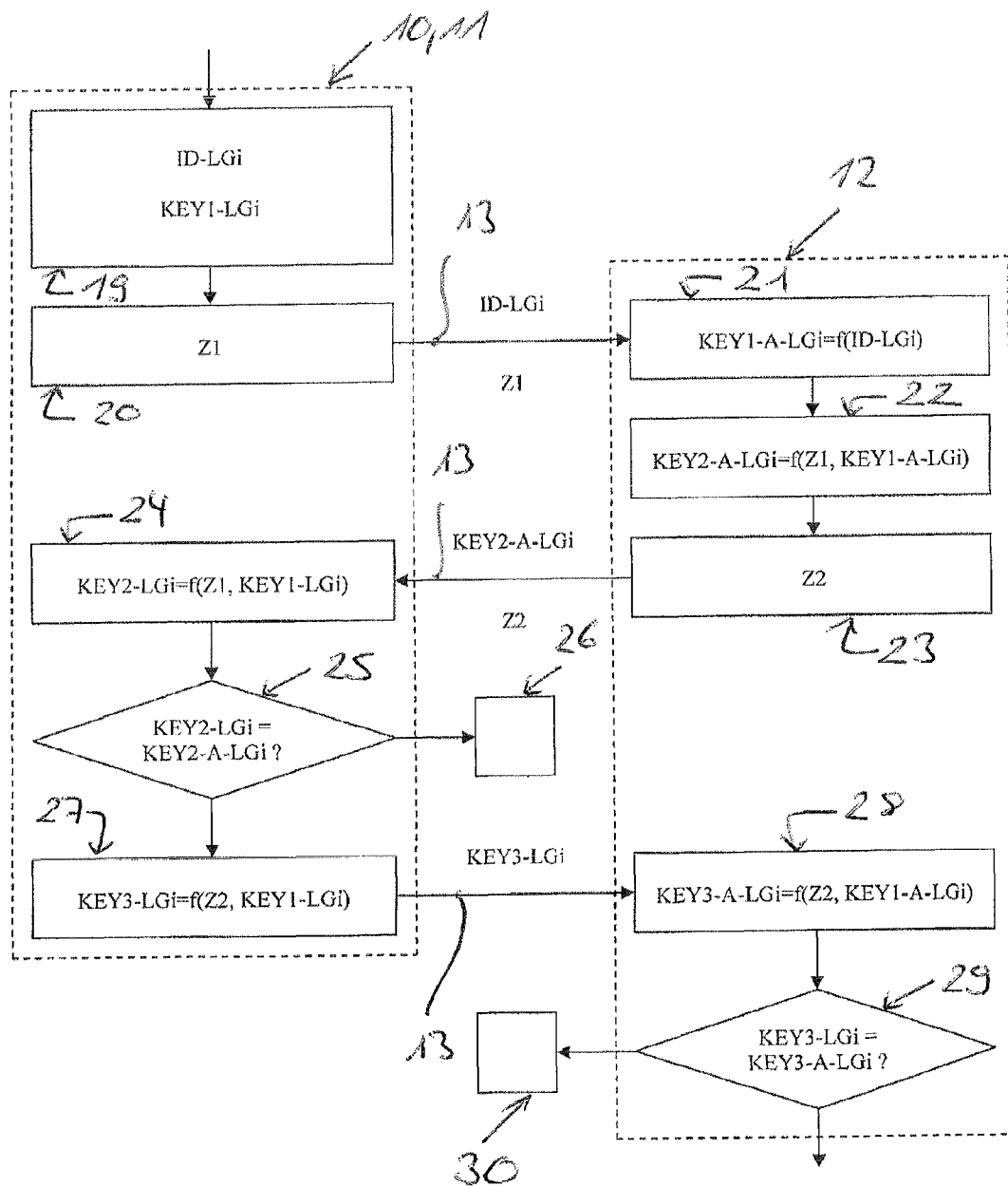
FIG. 3 presents a signal-flow diagram illustrating the authentication of the agricultural devices coupled via the data bus according to the invention.

In order to authenticate every agricultural device that is coupled to the data bus 13, the authentication device 12 is verified via the particular agricultural device 10, 11, and the particular agricultural device 10, 11 is verified via the authentication device 12. This is described in the following in detail with reference to FIG. 3.

A block 19 is visualized, in which an identification number ID-LGi (i=10, 11) of the particular agricultural device and a secret, first device key KEY-LGi are stored in the particular agricultural device 10, 11, namely in a control device thereof. According to a block 20, the particular agricultural device, namely the control device, determines a random number Z1. The particular agricultural device transmits the identification number ID-LGi stored in the control device thereof and the random number Z1 determined thereby to the authentication device 12 via the data bus 13. The secret first device key KEY-LGi of the particular agricultural device is not transmitted in this case. According to a block 21, the authentication device 12 determines a first device key KEY1-A-LGi on the basis of the identification number ID-LGi transmitted by the particular agricultural device and, in fact, with the aid of a key generator implemented in the authentication device 12.

According to block 22, the authentication device 12 determines a second device key KEY2-A-LGi on the basis of the first device key KEY1-A-LGi and the random number Z1 transmitted by the particular agricultural device. Furthermore, the authentication device 12 determines a random number Z2. The authentication device 12 transmits the second device key KEY2-A-LGi and the random number Z2 determined by the authentication device 12 via the data bus 13 to the control device of the particular agricultural device 10, 11.

The particular agricultural device also determines a second device key KEY2-LGi, according to block 24, on the basis of the first, secret device key KEY1-LGi stored in the control device thereof and on the basis of the random number Z1 determined thereby. In a block 25, the particular agricultural device compares the second device key KEY2-LGi determined thereby with the second device key KEY2-A-LGi determined and transmitted by the authentication device. If the two second device keys KEY2-A-LGi and KEY2-LGi match, the authentication device 12 has been successfully verified via the particular agricultural device 10, 11 and the procedure branches to block 27. If the two second device keys KEY2-A-LGi and KEY2-LGi do not match, however, the authentication device 12 has not been successfully verified and the procedure branches to block 26, wherein the authentication is terminated without success in block 26 (end).

In block 27, the particular agricultural device 10, 11 determines a third device key KEY3-LGi on the basis of the first device key KEY1-LGi stored in the control device thereof and on the basis of the random number Z2 transmitted by the authentication device 12. The particular agricultural device 10, 11 transmits this third device key KEY3-LGi via the data bus 13 to the authentication device 12, in a block 28, the authentication device 12 also determines a third device key KEY3-A-LGi on the basis of the first device key KEY1-A-LGi determined thereby and on the basis of the random number Z2 determined thereby. According to a block 29, the authentication device 12 compares the third device key KEY3-A-LGi determined thereby with the third device key KEY3-LGi determined and transmitted by the particular agricultural device. If the two third device keys KEY3-A-LGi and KEY3-LGi match, the particular agricultural device has been successfully verified via authentication device 12. If the two third device keys KEY3-A-LGi and KEY3-LGi do not match, however, the particular agricultural device has not been successfully verified and the procedure branches to block 30, wherein the authentication is terminated without success in block 30 (end).

In the preferred application, in which the intention is to couple a first agricultural device 10 embodied as a tractor and a second agricultural device 11 embodied as a harvesting machine, the tractor 10 and the harvesting machine 11 are authenticated independently of one another, preferably as follows:

According to the block 19, an identification number ID-LG10 of the tractor 10 and a secret first device key KEY-LG10 of the tractor 10 are stored in the tractor 10, namely in a control device thereof According to the block 20, the tractor 10 determines the random number Z1. The tractor 10 transmits the identification number ID-LG10 stored in the control device thereof and the random number Z1 determined thereby to the authentication device 12 via the data bus 13. The secret first device key KEY-LG10 of the tractor 10 is not transmitted in this case.

According to the block 21, the authentication device 12 determines a first device key KEY1-A-LG10 of the tractor 10 On the basis of the identification number ID-LG10 transmitted by the tractor 10 and, in fact, with the aid of a key generator implemented in the authentication device 12. According to block 22, the authentication device 12 determines a second device key KEY-A-LG10 of the tractor 10 on the basis of the first device key KEY1-A-LG10 and the random number Z1 transmitted by the tractor 10. Furthermore, the authentication device 12 determines a random number Z2. The authentication device 12 transmits the second device key KEY2-A-LG10 and the random number Z2 determined by the authentication device 12 to the control device of the tractor 10 via the data bus 13.

According to the block 24, the tractor 10 also determines a second device key KEY2-LG10 of the tractor 10 on the basis of the first, secret device key KEY1-LG10 stored in the control device thereof and on the basis of the random number Z1 determined thereby. In a block 25, the tractor 10 compares the second device key KEY2-LG10 determined thereby with the second device key KEY2-A-LG10 transmitted by the authentication device 12. If the two second device keys KEY2-A-LG10 and KEY2-LG10 match, the authentication device 12 has been successfully verified via the tractor 10. In this case, i.e., upon successful verification of the authentication device 12, the tractor 10 determines a third device key KEY3-LG10 for the tractor 10 on the basis of the first, secret device key KEY1-LG10 stored in the control device thereof and on the basis of the random number Z2 transmitted by the authentication device.

The tractor 10 transmits this third device key KEY3-LG10 to the authentication device 12 via the data bus 13. In the block 28, the authentication device 12 also determines a third device key KEY3-A-LG10 for the tractor 10 on the basis of the first device key KEY1-A-LG10 determined thereby and on the basis of the random number Z2 determined thereby. According to a block 29, the authentication device 12 compares the two third device keys KEY3-A-LG10 and KEY3-LG10. If the two third device keys match, the tractor 10 has been successfully verified via authentication device 12. After successful verification of the authentication device 12 via the tractor 10 and successful verification of the tractor 10 via the authentication device 12, the authentication of the tractor is successfully concluded.

The authentication of the harvesting machine 11 takes place in a similar manner: According to the block 19, an identification number ID-LG11 of the harvesting machine 11 and a secret first device key KEY-LG11 of the harvesting machine 11 are stored in the harvesting machine 11. According to the block 20, the harvesting machine 11 determines a random number Z1. The harvesting machine 11 transmits the identification number ID-LG11 stored therein and the random number Z1 determined thereby to the authentication device 12 via the data bus 13. The secret first device key KEY-LG11 of the harvesting machine 11 is not transmitted. According to the block 21, the authentication device 12 determines a first device key KEY1-A-LG11 of the harvesting machine 11 on the basis of the identification number ID-LG11 transmitted by the harvesting machine 11 and, in fact, with the aid of a key generator implemented in the authentication device 12.

According to block 22, the authentication device 12 determines a second device key KEY2-A-LG11 of the harvesting machine 11 on the basis of the first device key KEY1-A-LG11 and the random number Z1 transmitted by the harvesting machine 11. Furthermore, the authentication device 12 determines a random number Z2. The authentication device 12 transmits the second device key KEY2-A-LG11 of the harvesting machine 11 and the random number Z2 determined by the authentication device 12 to the harvesting machine 11 via the data bus 13. According to the block 24, the harvesting machine 11 also determines a second device key KEY2-LG11 of the harvesting machine 11 on the basis of the first, secret device key KEY1-LG11 stored therein and on the basis of the random number Z1 determined thereby. In a block 25, the harvesting machine 11 compares the second device key KEY2-LG11 determined thereby with the second &Vibe key KEY2-A-LG11 of the harvesting machine 11 transmitted by the authentication device 12. If the two second device keys KEY2-A-LG11 and KEY2-LG11 match, the authentication device 12 has been successfully verified via the harvesting machine 11.

In this case, the harvesting machine 11 determines a third device key KEY3-LG11 on the basis of the first, secret device key KEY1-LG11 stored therein and on the basis of the random number Z2 transmitted by the authentication device 12. The harvesting machine 11 transmits this third device key KEY3-LGi to the authentication device 12 via the data bus 13. In the block 28, the authentication device 12 also determines a third device key KEY3-A-LG11 for the harvesting machine 11 on the basis of the first device key KEY1-A-LG11 determined thereby and on the basis of the random number Z2 determined thereby. According to a block 29, the authentication device 12 compares the two third device keys KEY3-A-LG11 and KEY3-LG11. If the two third device keys match, the harvesting machine 11 has been successfully verified via authentication device 12. After successful verification of the authentication device 12 via the harvesting machine 11 and after successful verification of the harvesting machine 11 via the authentication device 12, the authentication of the harvesting machine 11 is successfully concluded.

It should be pointed out here that the secret first device key KEY1-LGi(i=10, 11) stored in the particular agricultural device 10, 11 and the first device key KEY1-A-LGi determined in the authentication device 12 are determined using the same key generators. The secret first device key KEY1-LGi stored in the agricultural device 10, 11 is determined via a key generator of an independent, higher-order data base. The first device key KEY1-A-LGi is determined in the authentication device 12 by the same type of key generator, which is implemented in the authentication device 12. it is furthermore pointed out here that at least the determination of the second device key KEY2-A-LGi in block 22 by the authentication device 12 and the determination of the third device key KEY3-LGi in block 27 by the particular agricultural device 10, 11 takes place with the aid of a non-reversible calculation method, e.g., a CRC32 calculation method. It is hereby ensured that the device keys KEY2-A-LGi and KEY3-A-LGi transmitted via the data bus 13 cannot be used to calculate back to the secret device key KEY1-LGi (i=10, 11) of the particular agricultural device 10, 11. This increases the immunity from interference of the method according to the invention.

If the intention is to implement an indirect data exchange 16, 17 between the tractor 10 and the harvesting machine 11 via the authentication device 12, according to FIG. 1, it is then automatically possible, upon successful authentication of the tractor 10 and the harvesting machine 11, for a data exchange 16, 17 to take place between the successfully authenticated tractor 10 and the successfully authenticated harvesting machine 11 via the authentication device 12.

Figure 2:
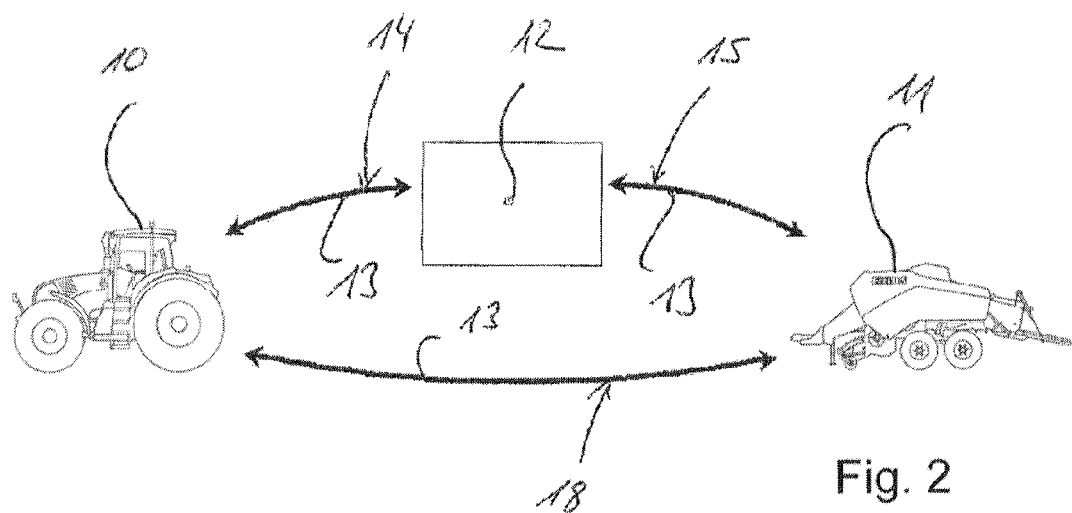
FIG. 2 depicts a second schematic representation of two agricultural devices coupled via a data bus, to illustrate a second embodiment of the invention.

If the intention is to implement a direct data exchange 18 between the tractor 10 and the harvesting machine 11, according to FIG. 2, while bypassing the authentication device 12, upon successful authentication of the tractor 10 and the harvesting machine 11, combination keys determined, which are then used for the direct data exchange 18. This is described in the following in detail with reference to FIG. 4.

According to FIG. 4, in order to ensure direct data exchange 18 between the first agricultural device 10, which is preferably designed as a tractor, and the second agricultural device 11, which is preferably designed as a harvesting machine, the authentication device 12 determines a fourth device key KEY4-A-LG10 for the first agricultural device 10 on the basis of a further random number Z3, which is determined by the authentication device 12 in a block 31, and on the basis of the first device key KEY1-A-LG10 according to the block 32, which is determined by the authentication device 12 for the first agricultural device 10. According to block 33, the authentication device 12 furthermore determines a secret combination key KEYC-A, wherein the secret combination key KEYC-A is a random number in particular. In a block 34, the authentication device 12 determines a system key KEYC-A-LG10 for the first agricultural device 10 on the basis of the first device key KEY1-A-LG10 determined in block 21, on the basis of the fourth device key KEY4-A-LG10 determined in block 32, and on the basis of the combination key KEYC-A determined in block 32.

The authentication device 12 transmits this system key KEYC-A-LG10 together with the further random number Z3 to the first agricultural device 10, wherein the first agricultural device 10 determines, in a block 35, the combination key KEYC on the basis of the system key KEYC-A-LG10 and the further random number Z3. On the basis of the system key KEYC-A-LG10 transmitted by the authentication device 12 and on the basis of the further random number Z3, it is possible to calculate back to the combination key KEYC but not to the secret first device key KEY1-LG10. The first agricultural device 10 stores the combination key KEYC and uses this for a subsequent, encoded data exchange with the second agricultural device 11.

As furthermore shown in FIG. 4, the authentication device 12 furthermore determines, in a block 37, a fourth device key KEY4-A-LG11 for the second agricultural device 11 on the basis of a further random number Z4 determined thereby in a block 36 and on the basis of the first device key KEY1-A-LG11 determined thereby for the second agricultural device 11 in block 21. According to a block 38, the authentication device 12 furthermore determines a system key KEYC-A-LG11 for the second agricultural device 11 on the basis of the first device key KEY1-A-LG11 determined in block 37, on the basis of the fourth device key KEY4-A-LG11 determined in block 37, and on the basis of the combination key KEYC-A determined in block 33.

The authentication device 12 transmits the system key KEYC-A-LG11 together with the further random number Z4 to the second agricultural device 11, wherein the second agricultural device 11 determines, in a block 39, the combination key KEYC on the basis of the system key KEYC-A-LG11 and the further random number Z4. On the basis of the system key KEYC-A-LG11 transmitted by the authentication device 12 and on the basis of the further random number Z4, it is possible to calculate back to the combination key KEYC but not to the secret first device key KEY1-LG11 of the second agricultural device 11. The second agricultural device 11 stores the combination key KEYC and uses this for a subsequent, encoded data exchange with the first agricultural device 10.

A subsequent, direct and encoded data exchange between the two agricultural devices 10, 11 takes place using the combination key KEYC.

The authentication device 12 according to the invention comprises means for carrying out the method according to the invention, at least means for the authentication in the sense of blocks 19 to 30, and, in a direct data exchange 18 between the authenticated agricultural devices 10, 11, and further comprises means for implementing the blocks 31 to 39. The means are at least one interface for data exchange with the agricultural devices 10 and 11, a memory for storing the related data, and a processor for determining the related data.

The authentication device 12 can be designed as a standalone assembly or can be integrated into the control devices of the agricultural devices 10 and 11, i.e., computer software stored in memory therein. It is possible, for example, for the authentication device 12 to be formed by a USB stick, which can be coupled to the data bus 13 via a USB interface of one of the agricultural devices 10, 11, i.e., the software used to implement the authentication method so described is uploaded via the USB interface to the control devices of the agricultural devices 10 and 11.

In all the embodiments describes, a so-called ISOBUS is preferably used as the data bus. This is standardized as a CAN bus according to ISO 11783 and regulates the communication between agricultural devices, in particular also the communication between agricultural devices from different manufacturers.

LIST OF REFERENCE CHARACTERS 10 agricultural device
11 agricultural device
12 authentication device
13 data bus
14 authentication
15 authentication
16 indirect data exchange
17 indirect data exchange
18 direct data exchange
19 block
20 block
21 block 22 block
23 block
24 block
25 block
26 block
27 block
28 block
29 block
30 block
31 block
32 block
33 block
34 block
35 block
36 block
37 block
38 block
39 block As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit whit has been invented, except to the extent that the following claims so limit that.

What is claimed is:

1. A method for authenticating of at least two agricultural machines coupled via a data bus prior to implement data exchange therebetween, comprising the steps of:
coupling an authentication device to the data bus;
coupling each of the at least two agricultural machines to the data bus;
utilizing the authentication device to authenticate each of the at least two agricultural machines coupled to the data bus automatically and independently, prior to implementing data exchange therebetween;
upon successful authentication of the at least two agricultural machines, implementing direct data exchange or indirect data exchange between the successfully authenticated at least two agricultural machines, automatically; and
upon unsuccessful authentication, blocking direct data exchange or indirect data exchange between the unsuccessfully authenticated agricultural machines.

2. The method according to claim 1, wherein the step of utilizing the authentication device to authenticate each of the at least two agricultural machines coupled to the data bus includes a step of verifying the authentication device via a particular agricultural machine and a step of verifying the particular agricultural machine via the authentication device.

3. The method according to claim 2, wherein the step of verifying the authentication device via a particular agricultural machine includes:
transmitting, by the particular agricultural machine, an identification number (ID-LGi) stored in a control device thereof and a random number (Z1) determined by the control device thereof to the authentication device;
determining, by the authentication device, a first device key (KEY1-A-LGi) on the basis of the identification number (ID-LGi) transmitted by the particular agricultural machine;
determining, by the authentication device, a second device key (KEY2-A-LGi) on the basis of the first device key (KEY1-A-LGi) and the random number (Z1) transmitted by the particular agricultural machine;
transmitting, by the authentication device, the second device key (KEY2-A-LGi) and a random number (Z2) determined by the authentication device to the control device of the particular agricultural machine; and
determining, by the particular agricultural machine, a second device key (KEY2-LGi) on the basis of a first device key (KEY1-LGi) stored in the control device thereof and on the basis of a random number (Z1) determined thereby and comparing the second device key (KEY2-LGi) determined thereby with the second device key (KEY2-A-LGi) determined and transmitted by the authentication device.

4. The method according to claim 3, wherein the step of verifying the particular agricultural machine via the authentication device comprises the steps of:
determining, by the particular agricultural machine device, a third device key (KEY3-LGi) on the basis of the first device key (KEY1-LGi) stored in the control device thereof and on the basis of the random number (Z2) transmitted by the authentication device and transmitting the third device key (KEY3-LGi) to the authentication device; and
determining, by the authentication device, a third device key (KEY3-A-LGi) on the basis of the first device key (KEY1-A) determined thereby and on the basis of the random number (Z2) determined thereby, and comparing the random number (Z2) with the third device key (KEY3-LGi) determined and transmitted by the particular agricultural machine.

5. The method according to claim 4, wherein upon successful verification of the authentication device and the particular agricultural machine device, the particular agricultural machine is successfully authenticated.

6. The method according to claim 1, further comprising carrying out an indirect data exchange between successfully authenticated agricultural machines via the authentication device.

7. The method according to claim 1, further comprising a direct data exchange between successfully authenticated agricultural machines while bypassing the authentication device.

8. The method according to claim 7, wherein the bypassing of the authentication device includes:
determining, by the authentication device, a fourth device key (KEY4-A-LG10) for the first agricultural machine on the basis of a further random number (Z3) determined thereby and on the basis of a first device key (KEY1-A-LG10) determined thereby for a first agricultural machine;
determining, by the authentication device, a combination key (KEYC-A);
determining, by the authentication device, a system key (KEYC-A-LG10) for the first agricultural machine on the basis of the first device key (KEY1-A-LG10), on the basis of the fourth device key (KEY4-A-LG10), and the combination key (KEYC-A);
transmitting, by the authentication device, the system key (KEYC-A-LG10) for the first agricultural machine (10) and the further random number (Z3) to the first agricultural machine device (10);
determining, by the first agricultural machine device, a combination key (KEYC) on the basis of the system key (KEYC-A-LG10) and the further random number (Z3);
determining, by the authentication device, a fourth device key (KEY4-A-LG11) for the second agricultural machine on the basis of a further random number (Z4) determined thereby and on the basis of a first device key (KEY1-A-LG11) determined for a second agricultural machine;

determining, by the authentication device, a system key (KEYC-A-LG11) for the second agricultural machine on the basis of the first device key (KEY1-A-LG11), on the basis of the fourth device key (KEY4-A-LG11) and on the basis of the combination key (KEYC-A);

transmitting, by the authentication device, the system key (KEYC-A-LG11) together with the further random number (Z4) to the second agricultural machine (11);

determining, by the second agricultural machine, the combination key (KEYC) on the basis of the system key (KEYC-A-LG11) and the further random number (Z4); and using, by the first agricultural machine and the second agricultural machine, the same determined combination key (KEYC) for the encoded, direct data exchange.

9. An authentication device configured for authenticating at least two agricultural machines coupled via a data bus prior to implementing data exchange therebetween, wherein the authentication device utilizes a method comprising the steps of:

coupling the authentication device to the data bus;

coupling each of the at least two agricultural machines to the data bus;

coupling each of the at least two agricultural machines to the data bus;

utilizing the authentication device to authenticate each of the at least two agricultural machines coupled to the data bus automatically and independently, prior to implementing data exchange therebetween;

upon successful authentication of the at least two agricultural machines, implementing direct data exchange or indirect data exchange between the successfully authenticated at least two agricultural machines, automatically; and upon unsuccessful authentication, blocking direct data exchange or indirect data exchange between the unsuccessfully authenticated agricultural machines.

10. A computer program product comprising program code means embodied in a non-transitory computer readable medium for carrying out all steps of a method for authenticating of at least two agricultural machines coupled via a data bus prior to implementing data exchange therebetween, when the program code means is run on a computer or control device, the method comprising the steps of:

coupling an authentication device to the data bus;

coupling the at least two agricultural machines to the data bus;

utilizing the authentication device to authenticate each of the at least two agricultural machines coupled to the data bus automatically and independently, prior to implementing data exchange therebetween;

upon successful authentication of the at least two agricultural machines, implementing direct data exchange or indirect data exchange between the successfully authenticated at least two agricultural machines, automatically; and upon unsuccessful authentication, blocking direct data exchange or indirect data exchange between the unsuccessfully authenticated agricultural machines.

11. The method according to claim 1, wherein a first of the at least two agricultural machines is a tractor.

12. The method according to claim 11, wherein a second of the at least two agricultural machines is a baler.

13. The authentication device according to claim 9, wherein a first of the at least two agricultural machines is a tractor.

14. The authentication device according to claim 13, wherein a second of the at least two agricultural machines is a baler.

15. The computer program product according to claim 10, wherein a first of the at least two agricultural machines is a tractor.

16. The method according to claim 15, wherein a second of the at least two agricultural machines is a baler.

* * * * *